United States Patent [19]
Ukon

[11] Patent Number: 5,136,422
[45] Date of Patent: Aug. 4, 1992

[54] REFLECTIVE OPTICAL SYSTEM FOR A MICROSCOPIC SPECTROMETER

[75] Inventor: Juichiro Ukon, Miyanohigashi, Japan

[73] Assignee: Horiba, Ltd., Kyoto, Japan

[21] Appl. No.: 607,307

[22] Filed: Oct. 31, 1990

[30] Foreign Application Priority Data

Nov. 3, 1989 [JP] Japan .................. 1-286891

[51] Int. Cl.⁵ .................. G02B 17/06; G02B 23/06
[52] U.S. Cl. .................. 359/366; 359/351
[58] Field of Search .................. 350/505, 504, 1.2; 250/353

[56] References Cited

U.S. PATENT DOCUMENTS

| | | | |
|---|---|---|---|
| 2,212,211 | 8/1940 | Pfund | 250/353 |
| 2,995,973 | 8/1961 | Barnes et al. | 350/505 |
| 3,040,176 | 6/1962 | Rempka et al. | 350/505 |
| 4,101,195 | 7/1978 | Korsch | 350/505 |
| 4,594,509 | 6/1986 | Simon et al. | 350/505 |
| 4,716,293 | 12/1987 | Harrick | 250/353 |
| 4,852,955 | 8/1989 | Doyle et al. | 350/1.2 |
| 4,922,104 | 5/1990 | Eguchi et al. | 350/1.2 |

FOREIGN PATENT DOCUMENTS

| | | | |
|---|---|---|---|
| 200133 | 10/1985 | Japan | 250/353 |
| 200134 | 10/1985 | Japan | 250/353 |

*Primary Examiner*—Jon W. Henry
*Attorney, Agent, or Firm*—Price, Gess & Ubell

[57] ABSTRACT

An optical system for a microscopic spectrometer includes an objective, an inverse placed telescope for relaying the image formed by the objective towards a detecting element, and an optical element for focusing the relayed image onto the detecting element. In the preferred embodiments, the inverse placed telescope is disposed after the image plane of a Cassegrain objective, and a paraboloid mirror collects the relayed light from the inverse placed telescope to be focused into an image on the detecting element. The inverse placed telescope has a smaller shading coefficient than the Cassegrain objective, and the size of the image of the pupil of the Cassegrain objective is smaller than the diameter of the secondary mirror of the inverse placed telescope. The image of the shaded diameter in the preferred embodiment, which is caused by the secondary mirror of the Cassegrain objective, is greater than the shading diameter caused by the inverse placed telescope itself.

21 Claims, 7 Drawing Sheets

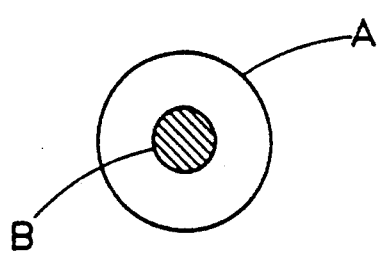
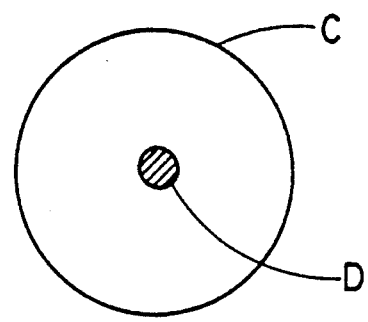
FIG. 3a        FIG. 3b
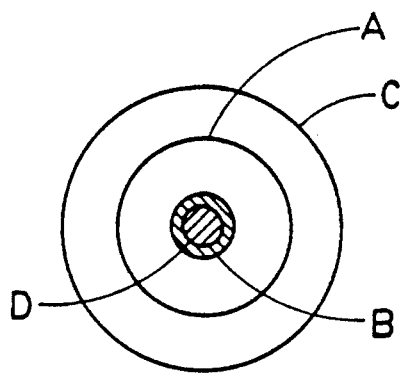
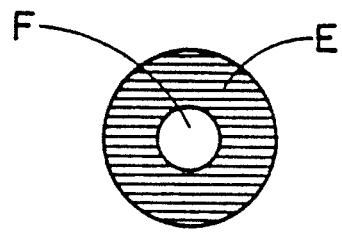
FIG. 3c        FIG. 3d
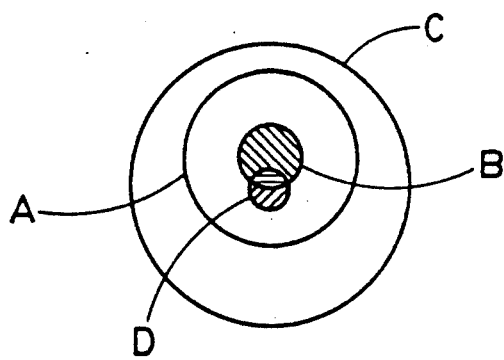
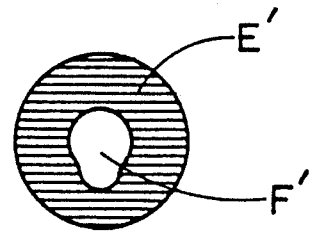
FIG. 3e        FIG. 3f

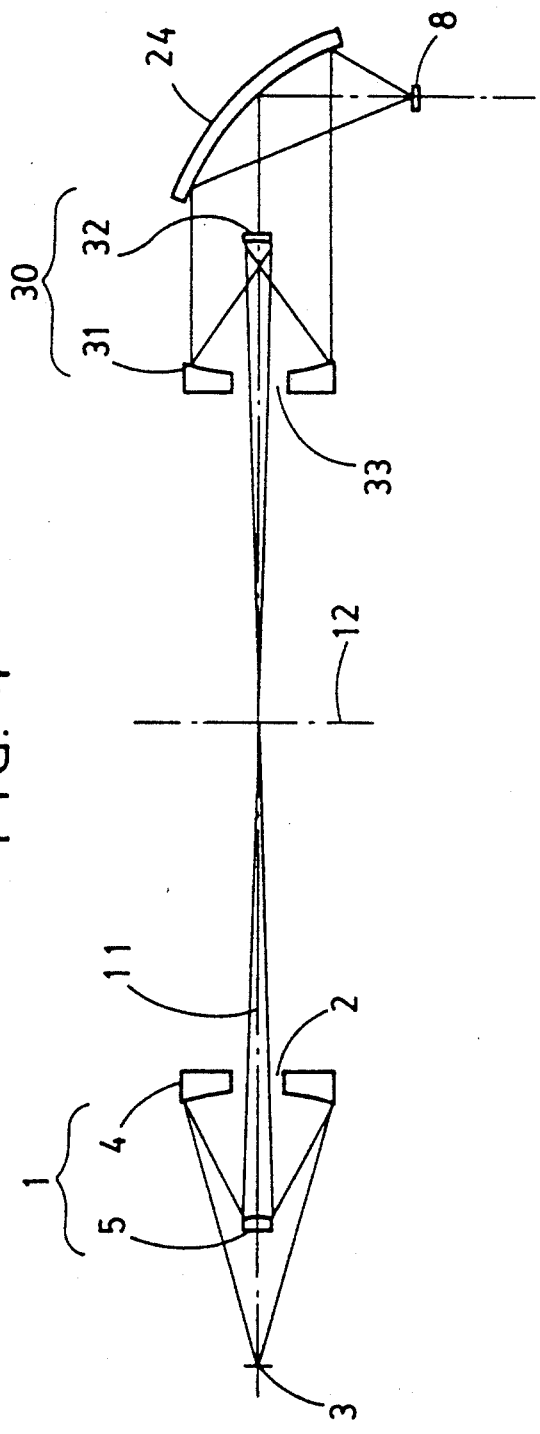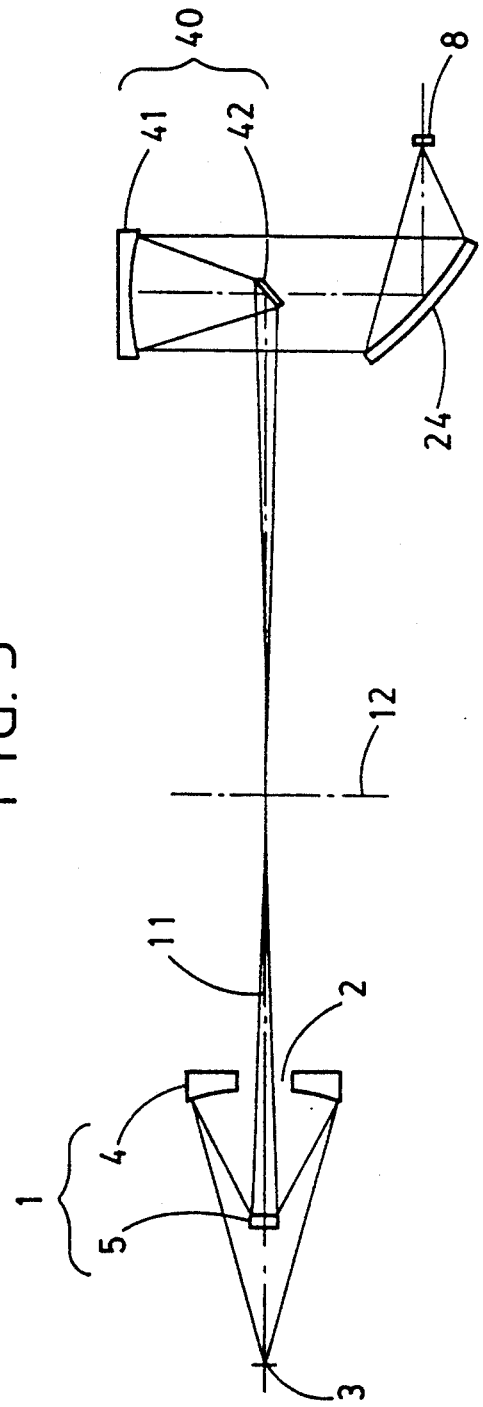

1

REFLECTIVE OPTICAL SYSTEM FOR A MICROSCOPIC SPECTROMETER

FIELD OF THE INVENTION

The present invention relates to microscopic spectrometers and, more particularly, to optical systems for microscopic spectrometers.

BACKGROUND OF THE INVENTION

Generally, microscopic spectrometers use refractive optics. However, refractive optics are not adequate for certain wavelength ranges; for example, soft x-rays, ultraviolet rays, or infrared rays. In this wavelength range, microscopic spectrometers utilize a Schwarzshild-type Cassegrain objective (hereinafter referred to as a "Cassegrain objective"). The Cassegrain objective includes two opposing spherical mirrors, which are used together to create an objective. The operation of the Cassegrain objective is discussed further below.

When spectrometrically measuring an electromagnetic wave within the wavelength ranges where refractive optics are inadequate, a mask is placed in the image plane of the Cassegrain objective to limit the area of the sample to be measured and avoid the mingling of optical information about the various areas on the sample. This is particularly important when measuring across the frequency spectrum. Since a detecting element cannot be placed in the image plane, the detecting element is placed behind the image plane to obtain information about the part of the image plane which is not masked.

However, microscopic spectrometers using Cassegrain objectives also use a Cassegrain mirror system in the relay optical system. In infrared microscopic spectrometry, a Hg-Cd-Te crystal is used as a detecting element. Since the sensitivity of the crystal is inversely proportional to the volume of the crystal, the crystal is miniaturized as much as possible. Therefore, the relay optical system is configured to project the image produced by the Cassegrain objective into a small contracted area.

FIG. 6 shows a conventional microscopic spectrometer. Therein, a Cassegrain objective 1 includes a concave main mirror 4 having a central opening 2. The mirrored surface of the main mirror 4 faces the sample 3 and a secondary mirror 5. The main mirror 4 reflects an image of the sample 3 onto the secondary mirror 5. The secondary mirror 5 has a convex mirrored surface facing the concave mirrored surface of the main mirror 4.

A relay optical system 6 also includes an inverse placed Cassegrain objective system (hereinafter referred to as "Cassegrain relay optics"). The Cassegrain relay optics 6 includes a concave main mirror 9 with a central opening 7. The mirrored surface of the main mirror 9 faces away from the Cassegrain objective 1, thereby providing a reflective surface between the secondary mirror 10 and a detecting element 8. The secondary mirror 10 has a convex mirrored surface and is positioned on the opposite side of the main mirror 9 from the Cassegrain objective 1. In this configuration, each of the optical elements is operatively positioned along an optical axis 11, allowing interaction with an image plane 12 which is created by the Cassegrain objective 1.

In the configuration illustrated in FIG. 6, the secondary mirror 5 serves as surface inside the pupil of the Cassegrain objective 1. The central opening 2 is the pupil of the Cassegrain objective 1. The secondary mirror 5 obstructs a portion of the sample 3 from being viewed by the main mirror 4. The light information reflected by the secondary mirror 5 is hollow in that it lacks information regarding a central portion of the sample 3.

FIG. 7(a) illustrates the light information reflected from the pupil surface of the secondary mirror 5. Therein, A represents the diameter of the pupil surface of the secondary mirror 5, and B designates the portion of the light information which has been previously obstructed by the secondary mirror 5.

FIG. 7(b) is a likewise illustration of the optical throughput of the Cassegrain relay optics 6. Therein, C represents the diameter of the pupil of the secondary mirror 1, and D represents the information which is obstructed by the secondary mirror 10 from reaching the detecting element 8.

Therefore, the efficient transmission of light from the sample 3 to the detecting element 8 through the configuration illustrated in FIG. 6 requires that the pupils A and C coincide in size and shading coefficient. Consequently, in the best configuration, A = C and B = D.

This rule for the efficient transmission of light in the optical configuration shown in FIG. 6 only holds true when the sample 3 is disposed on the optical axis 1 1. A sample which is slightly displaced from the optical axis 11 is illustrated by reference numeral 3'. In this configuration, light transmitted from the sample 3' cannot be efficiently focused onto the detecting element 8. Furthermore, when the Cassegrain systems 1, 6 are different in magnification and numerical aperture, or if the pupils are different in size and shading coefficient, even a sample 3 disposed on the optical axis 11 will not produce an efficient transmission of light to the detector 8.

FIG. 7 illustrates the various pupil configurations and transmissions of the optical configuration illustrated in FIG. 6. As explained above, FIGS. 7(a) and 7(b) show the pupil size and transmissions for the Cassegrain objective 1 and the Cassegrain relay optics 6, respectively. As discussed above, when A = C and B = D and the sample 3 is disposed on the optical axis 11, the projection of the pupil of the Cassegrain objective 1 onto the pupil of the Cassegrain relay optics 6 produces the configuration shown in FIG. 7(c), and the effective beam which is transmitted to the detecting element 8 is shown in FIG. 7(d).

In FIG. 7(d), the lattice portion E illustrates the light information which impinges upon the detecting element 8, and the nonlatticed portion F illustrates the information from the sample 3 which is obstructed by the secondary mirrors 5 and 10. The nonlatticed portion F is minimized because the secondary mirror 10 introduces no additional obstruction to the obstruction caused by the secondary mirror 5.

However, when the sample 3' is introduced configuration shown in FIG. 6, the transmission of the pupils of the Cassegrain objective 1 and the Cassegrain relay optics 6 are shown overlapped in FIG. 7(e), and the effective beam transmitted to the detecting element 8 is shown in FIG. 7(f) as the lattice portion E'. The lattice portion E' is considerably less in area than the lattice portion E shown in FIG. 7(d). Furthermore, the nonlatticed portion F' shows the obstructed portion which is considerably greater in area than the obstructed portion F shown in FIG. 7(d). Light from the sample 3' cannot be efficiently transmitted to the detecting element 8 because the sample 3' is not present on the optical axis 11.

A paraboloid mirror or an ellipsoid mirror might be used in the Cassegrain relay optics 6 discussed above to make the pupils more adaptable when the sample 3' is displaced from the optical axis 11. However, since the relay optics 6 transmits light from the Cassegrain objective 1 to the detecting element 8, the numerical aperture of the relay optics 6 must be at least the same as the objective 1. On the other hand, it is extremely advantageous to use a smaller detecting element 8, as described above, so that the relay optics 6 contracts the light transmitted into a small area.

For example, if (1) the diameter of the detecting element 8 is 250 microns, (2) the diameter of the maximum measuring field of view is 250 microns, (3) the magnification of Cassegrain objective 1 is 15, and (4) the numerical aperture on the sample side is 0.3, then the numerical aperture on the image side of the Cassegrain objective 1 becomes 0.02, and the diameter of the image becomes 3.75 millimeters. If the Cassegrain objective 1 is to transmit light to an ellipsoid mirror 14 for focusing onto the detecting element 8, as shown in FIG. 8, the contraction factor is 1/15 when the short focal distance of the eccentric ellipsoid mirror 14 is 50 millimeters, and the long focal distance becomes 750 millimeters.

Furthermore, if an angle between the optical axis 11 and the highest point of information being transmitted by the secondary mirror 5 of the Cassegrain objective 1 to the image plane 12 is 0.5 degrees, then the distance of that information from the optical axis 11 at the ellipsoid mirror 14 becomes 6.5 millimeters. For the geometry shown in FIG. 8, this corresponds to a 125-micron height on the sample 3. In that case, the numerical aperture becomes 0.02, and the entire diameter of 30 millimeters. Thus, the effective diameter required for the ellipsoid mirror 14 becomes 43 millimeters or more, making the apparatus extremely large-sized. Since the long focal distance of the ellipsoid mirror 14 increases as the contraction factor of the ellipsoid mirror 14 is reduced, the overall apparatus becomes extremely large and cumbersome.

When the microscope is used in the infrared spectrum, an additional disadvantage stems from the absorption of transmitted light between the optical elements by carbonic acid gas and steam present along the optical path. Thus, the use of an ellipsoid mirror 14 is additionally not preferable when used in infrared microscopes.

The above-referenced discussion is additionally applicable to paraboloid mirrors used in place of the ellipsoid mirror 14 because two paraboloid mirrors would be used having focal distances of 750 millimeters and 50 millimeters, respectively.

OBJECTS OF THE INVENTION

It is therefore an object of the present invention to provide an improved microscopic spectrometer;

It is a further object of the invention to provide a microscopic spectrometer capable of efficiently transmitting light from an object to a detector;

It is a further object of the invention to provide a microscopic spectrometer which efficiently transmits light from a sample to a detector when the sample is displaced from the optical axis of the optical system of the microscopic spectrometer; and It is yet a still further object of the present invention to provide a microscopic spectrometer which effectively transmits light from a sample to a detector when the sample is displaced from the optical axis and where large-sized optics are not necessary.

SUMMARY OF THE INVENTION

These and other objects are provided by the present invention, which may be generally characterized as an optical system for a microscopic spectrometer which includes an objective that accepts light information from a sample and forms an image, an inverse placed telescope for relaying the image formed by the objective towards a detecting element, and an optical element for focusing the relayed image onto the detecting element. The configuration of the optical elements in the present invention minimizes the interference with the image of the sample which is caused by the relay optics of a microscopic spectrometer.

In the preferred embodiments of the invention, the relay optical system of a microscopic spectrometer includes an inverse placed telescope disposed after the image plane of a Cassegrain objective along the optical path. A paraboloid mirror collects light from the inverse placed telescope, and focuses that light into an image on a detecting element.

The inverse placed telescope has a smaller shading coefficient than the Cassegrain objective, and the size of the image of the pupil of the Cassegrain objective is smaller than the diameter of the secondary mirror used in the inverse placed telescope. Furthermore, the image of the shaded diameter caused by the secondary mirror of the Cassegrain objective which is projected onto the inverse placed telescope should be greater than the shading diameter caused by the inverse placed telescope itself. These relationships will provide for an efficient transmission of information from a sample, either existing on the optical axis or displaced from the optical axis.

In a further aspect of the preferred embodiment of the invention, the inverse placed telescope creates an image which subtends an angle greater than an angle of the rays accepted by the objective from the sample. In such a configuration, the image of the shading by the secondary mirror of the objective will subtend an angle which is not interfered with by the secondary mirror of the inverse placed telescope. Thus, the inverse placed telescope will contribute a minimum amount of interference with the throughput of the image of the sample.

BRIEF DESCRIPTION OF THE DRAWINGS

The present invention, both as to its organization and manner of operation, together with further objects and advantages, may be understood by reference to the following description, taken in connection with the accompanying drawings.

FIGS. 3(a)-3(f) are illustrations showing the relationship between pupils of a Cassegrain objective and an inverse placed Cassegrain telescope in producing an efficient transmission when a sample exists on an optical axis, or when a sample is displaced from the optical axis in the apparatus shown in FIG. 1;

FIG. 4 is a block diagram showing a microscopic spectrometer according to a second preferred embodiment of the present invention;

FIG. 5 is a block diagram showing a microscopic spectrometer according to a third preferred embodiment of the present invention;

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Figure 1:
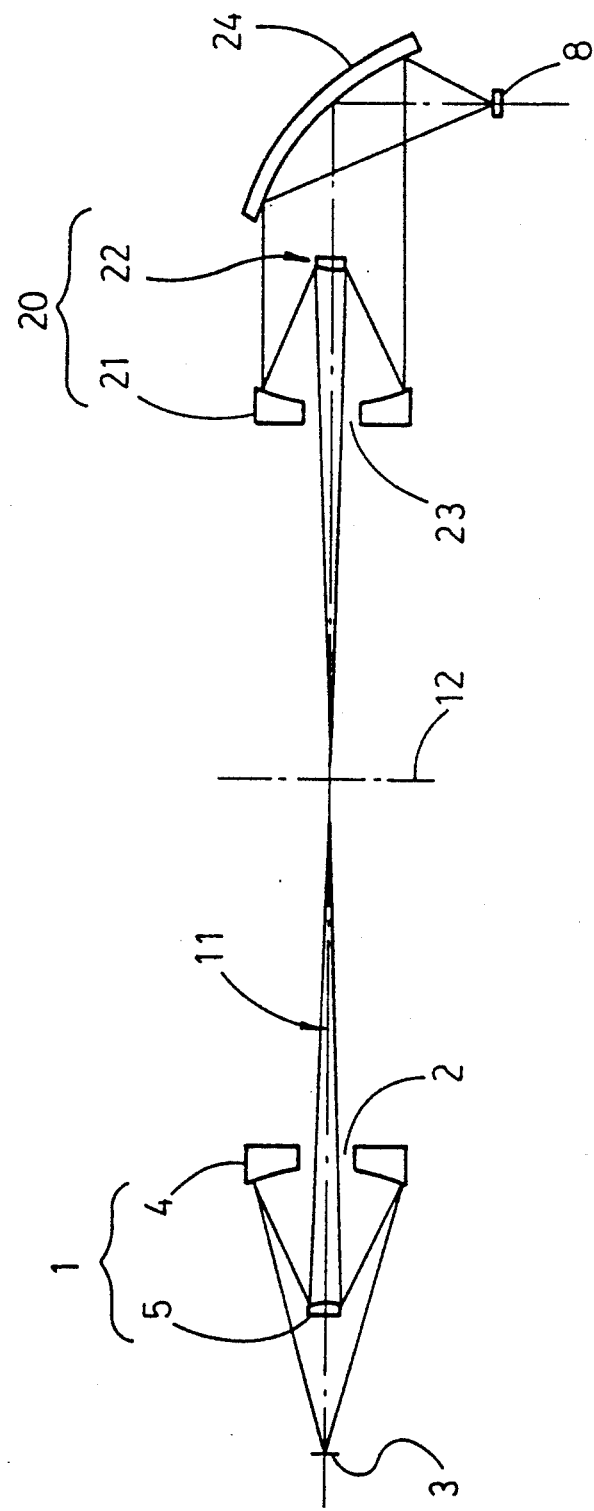
FIG. 1 is a block diagram showing a microscopic spectrometer according to a preferred embodiment of the present invention.

FIG. 1 illustrates a microscopic spectrometer configured according to a preferred embodiment of the present invention. An inverse placed Cassegrain telescope 20 acts as a relay optical system on the opposite side of image plane 12 from the Cassegrain objective 1.

An inverse placed telescope is a telescope having an arrangement opposite to that usually seen for the optical element in an optical configuration. The image plane 12 is placed at a focal point of the telescope 20 to allow the telescope 20 to produce light in the form of parallel rays.

The Cassegrain telescope 20 includes a main mirror 21 which is concave and has a positive focal distance. Cassegrain telescope 20 also includes a secondary mirror 22 which is a convex mirror having a negative focal distance.

The main mirror 21 includes a central opening 23, and the mirrored surface of the main mirror 21 faces away from the image plane 12 and the Cassegrain objective 1. The convex mirrored surface of the secondary mirror 22 faces the mirrored surface of the main mirror 21 and the Cassegrain objective 1. The secondary mirror 22 is placed slightly closer to the main mirror 21 than a focal point of the main mirror 21. Therefore, a beam reflected from the secondary mirror 5 of the Cassegrain objective 1 is reflected by the secondary mirror 22 of the inverse placed Cassegrain telescope 20 onto the main mirror 21 and reflected by the main mirror 21 in the form of parallel rays.

A paraboloid mirror 24 is placed behind the inverse placed Cassegrain telescope 20 to receive the parallel rays reflected by the main mirror 21 and focus those parallel rays onto a detector 8. The detector 8 is placed at a focal point of the paraboloid mirror 24. Thus, the parallel beams from the inverse placed Cassegrain telescope are converged by the paraboloid mirror 24 to be incident upon the detecting element 8.

In the microscopic spectrometer shown in FIG. 1, light from the sample 3 is incident upon the main mirror 4 of the Cassegrain objective 1. However, part of the light information from the sample 3 is masked by the secondary mirror 5. The masking coefficient of the secondary mirror 5 reaches 0.3 to 0.4 in the shown Schwarzshild-type Cassegrain objective 1. The light information from the sample 3 is reflected by the main mirror 4 onto the secondary mirror 5 to be focused into an image at the image plane 12 of the Cassegrain objective 1.

Light from the image plane 12 is incident upon the secondary mirror 22 of the inverse placed Cassegrain telescope 20 and reflected upon a mirrored surface of the main mirror 21 to produce parallel rays. The parallel rays are converged by the paraboloid mirror 24 to be focused into an image. The image produced by the paraboloid mirror 24 is smaller than the image produced at the image plane 12. The paraboloid mirror 24 focuses the image onto the image plane of the detecting element 8.

The shading coefficient of the secondary mirror 22 of the inverse placed Cassegrain telescope 20 should be smaller than the secondary mirror 5 of the Cassegrain objective 1. For example, the shading coefficient of the secondary mirror 22 may be 0.3 or less. Furthermore, the diameter of an image projected from the Cassegrain objective should be less than or equivalent to the diameter of the secondary mirror 22.

The rays from the sample 3 are accumulated by the main mirror 4 in a diverging pattern. Thus, the rays reflected by the main mirror 21 are in a parallel pattern, the image produced by the main mirror 21 will include a shaded portion having a diameter greater than the diameter of the secondary mirror 22.

The shaded portion produced by the main mirror 21 will correspond to the shading of the light information by the secondary mirror 5 in the Cassegrain objective 1. Since the image of the shaded portion produced by the main mirror 21 is larger than the diameter of the secondary mirror 22, the secondary mirror 22 will introduce no additional shading to the light information.

This minimizing of additional shading by the secondary mirror 22 will also hold true for a sample 3' displaced from the optical axis. When the sample 3' is displaced from the optical axis, the Cassegrain objective uses a large angle of view, and the amount of shading caused by the secondary mirror 22 in the inverse placed Cassegrain telescope 20 is reduced from the conventional configuration. Thus, the light can be efficiently transmitted to the detecting element 8. Furthermore, the microscopic spectrometer of the present invention can additionally cope with a Cassegrain objective 1 having a different magnification and numerical aperture from the sample.

The various shadings of the Cassegrain objective 1 and the inverse placed Cassegrain telescope 20 of the preferred embodiment illustrated in FIG. 1 are shown in FIG. 2 for a sample existing on or off of the optical axis 11. The shapes of the pupils of the Cassegrain objective 1 and the inverse placed Cassegrain telescope 20 are shown in FIG. 2(a) and 2(b), respectively. Therein, A, C represent the pupils of the Cassegrain objective 1 and the inverse placed telescope 20, respectively, and B, C represent the shaded portion in the image produced by the secondary mirror of each, respectively.

Figure 2A:
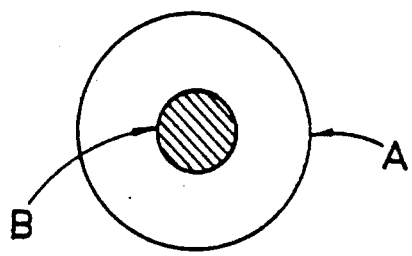
FIGS. 2(a)-2(f) illustrations showing the relationship between pupils of a Cassegrain objective and an inverse placed Cassegrain telescope in producing an efficient transmission when a sample exists on an optical axis, or when a sample is displaced from the optical axis in the apparatus shown in FIG. 1.
Figure 2B:
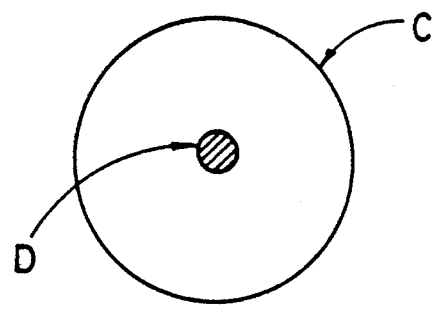
Figure 2C:
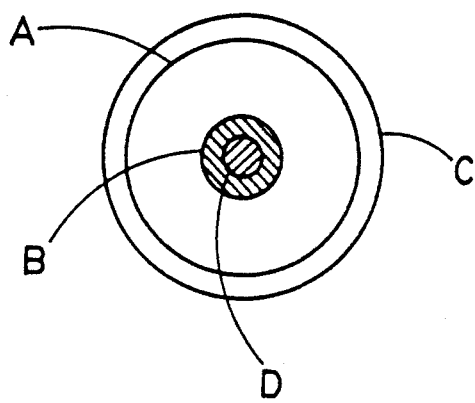
Figure 2D:
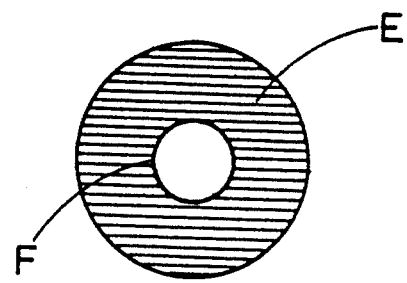

The projection of the pupils and shaded portions shown in FIG. 2(a) and 2(b) are shown in FIG. 2(c) projected one upon another. The effective beam which is finally produced by the inverse placed Cassegrain telescope 20 is shown in FIG. 2(d). One will note that the size of the effective beam illustrated in FIG. 2(d) is the same size as the effective beam illustrated in FIG.

7(d). This is true because the shading coefficient of the inverse placed Cassegrain telescope 20 is smaller than the shading coefficient of the Cassegrain objective 1.

Figure 2E:
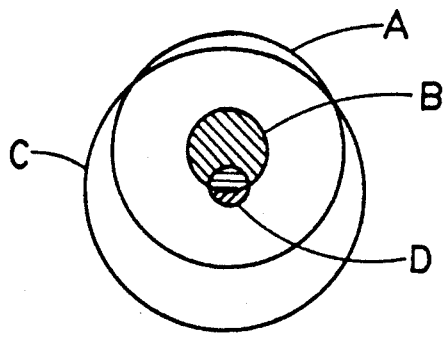
Figure 2F:
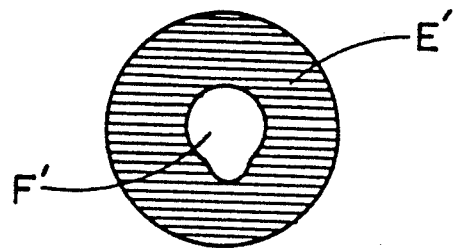
Figure 7A:
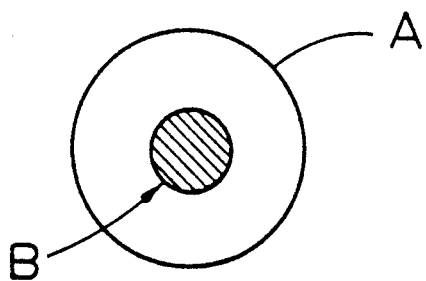
FIGS. 7(a)–7(f) are diagrams showing the relationship between a pupil of a Cassegrain objective and a pupil of an inverse placed Cassegrain objective in producing a light transmission of a sample displaced on an optical axis and a sample displaced from the optical axis of the apparatus shown in FIG. 6.
Figure 7B:
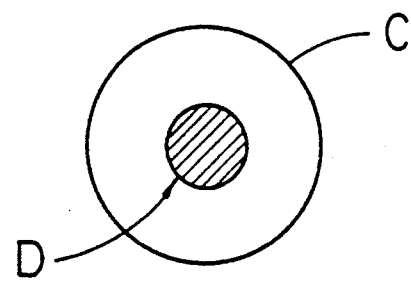
Figure 7C:
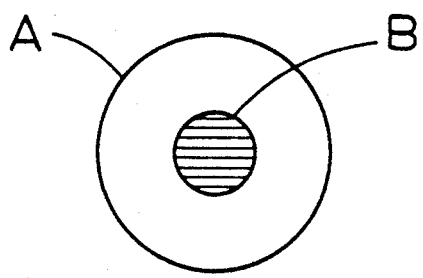
Figure 7D:
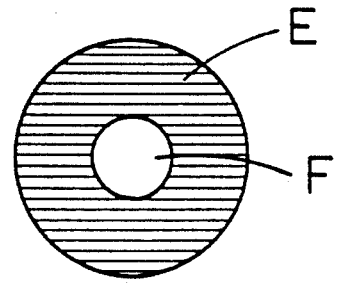
Figure 7E:
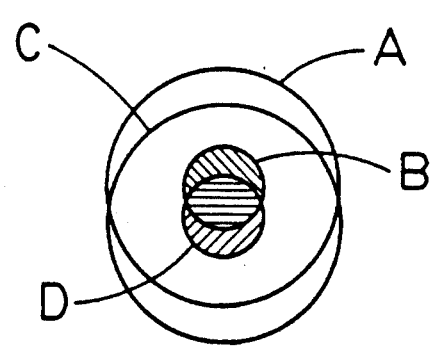
Figure 7F:
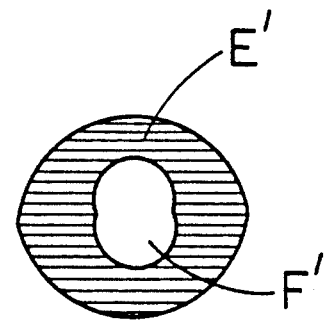
Figure 8:
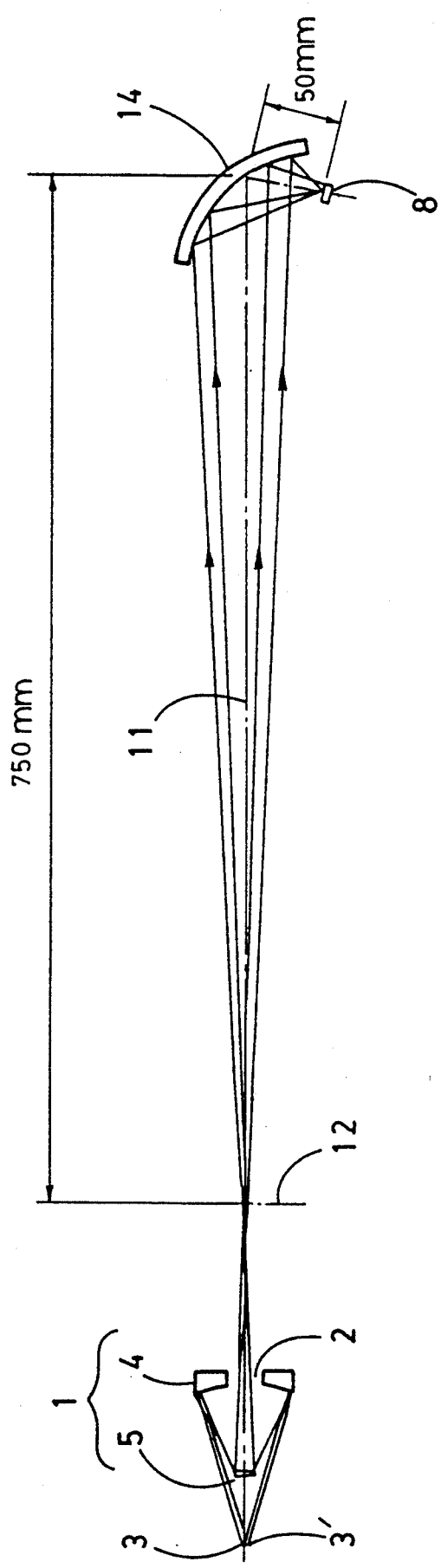
FIG. 8 is a block diagram showing a microscopic spectrometer using ellipsoid relay optics.

FIG. 2(e) and 2(f) illustrate the transmission of light information in the preferred embodiment illustrated in FIG. 1 when a sample 3' is displaced from the optical axis 11. Since the shading coefficient of the inverse placed Cassegrain telescope is smaller than the Cassegrain objective 1, the shaded area D shown in FIG. 2(e) is much less than the shaded area D shown in FIG. 7(e). Thus, the effective beam E shown in FIG. 2(f) is larger than the effective beam shown in FIG. 7(f).

Figure 6:
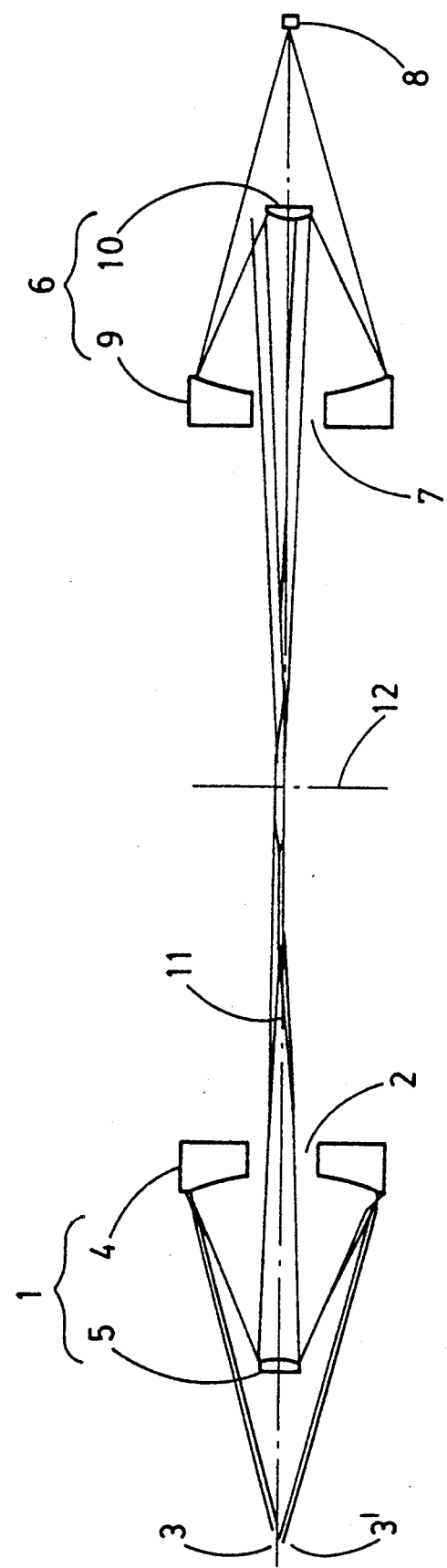
FIG. 6 is a block diagram showing a conventional microscopic spectrometer.

As can be seen, the preferred embodiment is much b more adaptable to a sample 3 displaced from the optical axis 11 than the conventional microscopic spectrometer illustrated in FIG. 6. Furthermore, the magnification and numerical aperture of the Cassegrain objective 1 may be changed, thereby changing the size of the pupil of the Cassegrain objective 1, without altering the shading coefficient of the apparatus. This is illustrated in the diagram shown in FIG. 3(a) to (f).

FIG. 3(a) illustrates the pupil size A and te secondary mirror shading B of the Cassegrain objective 1. FIG. 3(b) illustrates the pupil size C and the secondary mirror shading of the inverse placed telescope 20. In the illustrations of FIG. 3, the diameter of the shaded portion and pupil of the Cassegrain objective 1 is reduced from that shown in FIG. 2(a). However, FIG. 3(b) shows that the diameter of the inverse placed Cassegrain telescope 20 is smaller than the diameter of the shaded portion shown in FIG. 3(a). Thus, as shown in FIG. 3, the increased masking caused by a sample 3' which is displaced from the optical axis 11 is greatly reduced.

Light information from a sample 3 on the optical axis 11, and a sample 3' displaced from the optical axis 11, are efficiently transmitted to the detecting element 8. Since the focal point of the inverse placed Cassegrain telescope 20 is close, the distance between the Cassegrain objective 1 and the inverse placed Cassegrain telescope 20 is minimized, a microscopic spectrometer may be miniaturized.

Further preferred embodiments of the present invention are shown in FIGS. 4 and 5. In FIG. 4, an inverse placed Gregorian telescope 30 replaces the inverse placed Cassegrain telescope 20 illustrated in FIG. 1. With the exception of this change in the relay optics, the other details of the embodiment remain the same as that shown in FIG. 1, and are incorporated herein by reference.

The inverse placed Gregorian telescope 30 includes a main mirror 31 having a concave mirrored surface with a positive focal distance and a secondary mirror 32 having a concave mirrored surface with a positive focal distance. The main mirror 31 has a central opening 33. The mirrored surface of the main mirror 31 faces away from the Cassegrain objective 1, allowing reflection from the secondary mirror 32 to the paraboloid mirror 24.

The secondary mirror 32 is displaced from the main mirror 31 at a distance slightly further than the focal point of the main mirror 31. The secondary mirror 32 thereby accepts light information from the Cassegrain objective 1 and reflects that light information to the main mirror 31. The secondary mirror 32 is placed at a position displaced from the main mirror 31 to cause light reflected from the main mirror 31 to be transmitted to the paraboloid mirror 24 in parallel beams.

FIG. 5 shows a preferred embodiment of the invention wherein an inverse placed Newton telescope 40 is incorporated into the relay optical system of a microscopic spectrometer. This inverse placed Newton telescope 40 replaces the inverse placed Gregorian telescope 30 and the inverse placed Cassegrain telescope 20 of the embodiments shown in FIGS. 4 and 1.

The inverse placed Newton telescope 40 includes a main mirror 41 having a concave mirrored surface with a positive focal distance and a secondary mirror 42 which is a flat mirror. The secondary mirror 42 is placed diagonally to the optical axis 11. Thus, light information from the Cassegrain objective 1 is reflected from the secondary mirror 42 onto the mirrored surface of the main mirror 41. The main mirror 41 has its mirrored surface generally parallel to the optical axis 11.

Light reflected from the secondary mirror 42 is again reflected from the mirrored surface of the main mirror 41 onto the paraboloid mirror 24 to be focused into the detecting element 8. The manner of operation of the embodiment shown in FIG. 5 is similar to the manner of operation of the embodiment shown in FIG. 4, and is easily understood therefrom.

In the preferred embodiments of the invention, the relay optical system of a microscopic spectrometer includes an inverse placed telescope disposed after the image plane of a Cassegrain objective along the optical path. A paraboloid mirror collects the light from the inverse placed telescope and focuses that light into an image on a detecting element.

The inverse placed telescope has a smaller shading coefficient than the Cassegrain objective, and the size of the image of the pupil of the Cassegrain objective is smaller than the diameter of the secondary mirror used in the inverse placed telescope. Furthermore, the image of the shaded diameter caused by the secondary mirror of the Cassegrain objective which is projected onto the inverse placed telescope should be greater than the shading diameter caused by the inverse placed telescope itself. These relationships will provide for an efficient transmission of information from a sample, either existing on the optical axis or displaced from the optical axis.

Additionally, the synthetic focal distance from the mirrors composing the inverse placed telescope may be long, but the actual optical path length should be short, thereby minimizing the distance between the Cassegrain objective and the inverse placed telescope. Since the optical path length is minimized, the influence of obstructions within the optical path is additionally minimized, and a more accurate measurement can be made.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An optical system for a microscopic spectrometer, comprising:
   an object;
   an objective including a main mirror and a secondary mirror, the objective main mirror receiving primary rays of light subtending a first angle from the object and transmitting the received light rays to the objective secondary mirror, the primary rays being received by the objective main mirror also being shaded by the secondary mirror, which subtends a second angle from the object;

an inverse placed optical element including a main mirror and a secondary mirror, the inverse element secondary mirror receiving the light information reflected from the objective secondary mirror and sending the received light information to the inverse element main mirror, the inverse element main mirror refocusing the light in secondary rays subtending a third angle, the secondary rays being shaded by the inverse element secondary mirror subtending a fourth angle such that the ratio of the second angle to the first angle is greater than the ratio of the fourth angle to the third angle, the inverse element's focal point being aligned with the objective's image plane; and a detector for receiving the light information from the inverse element.

2. The apparatus of claim 1 wherein the inverse placed optical element is positioned after the image plane of the objective.

3. The apparatus of claim 1 wherein the objective is a Cassegrain objective.

4. The apparatus of claim 1 wherein the inverse placed optical element induces a smaller shading coefficient than a shading coefficient induced by the objective.

5. The apparatus of claim 1 wherein the inverse placed optical element is a Cassegrain telescope.

6. The apparatus of claim 1 wherein the inverse placed optical element is a Gregorian telescope.

7. The apparatus of claim 1 wherein the inverse placed optical element is a Newton telescope.

8. An optical system for a microscopic spectrometer, comprising:

an object;

an objective including a main mirror and a secondary mirror, the objective main mirror receiving light information from the object and transmitting the received light information to the objective secondary mirror, the objective secondary mirror causing a first shading coefficient to be induced in the light information received by the objective main mirror;

an inverse placed optical element including a main mirror and a secondary mirror, the inverse element secondary mirror receiving the light information from the objective secondary mirror and sending the received light information to the inverse element main mirror, the inverse element secondary mirror inducing a second shading coefficient in the light information retransmitted by the inverse element main mirror such that the first shading coefficient is less than the second shading coefficient, the inverse element's focal point being aligned with the objective's image plane; and a detector for receiving the light information from the inverse element.

9. The apparatus of claim 8, further comprising a focusing optical element for focusing the relayed light information onto the detecting element.

10. The apparatus of claim 9 wherein the focusing optical element is a paraboloid mirror which focuses the relayed image into light information on the detecting element.

11. The apparatus of claim 8 wherein light information defining an image of a pupil of the objective defines a smaller space transverse to an optical axis than a transverse space defined by a secondary mirror of the inverse placed optical element.

12. The apparatus of claim 8 wherein light information defining an image of the object which has been shaded by the objective's secondary mirror and projected onto the inverse placed optical element has a greater shading than a shading of the relayed information caused by the inverse placed secondary mirror.

13. The apparatus of claim 8, further comprising a focusing optical element for focusing the related light information onto the detecting element.

14. The apparatus of claim 13 wherein the focusing optical element is a paraboloid mirror which focuses the related image into light information on the detecting element.

15. The apparatus of claim 8 wherein the inverse placed optical element is positioned after an image plane of the objective.

16. The apparatus of claim 8 wherein the objective is a Cassegrain objective.

17. The apparatus of claim 8 wherein an image of a pupil of the objective is smaller than a secondary mirror of the inverse placed optical element.

18. The apparatus of claim 8 wherein an image of the object which has been shaded by the objective's secondary mirror and projected onto the inverse placed optical element has a greater shading than a shading of the relayed light information caused by the inverse element secondary mirror.

19. The apparatus of claim 8 wherein the inverse placed optical element is a Cassegrain telescope.

20. The apparatus of claim 8 wherein the inverse placed optical element is a Gregorian telescope.

21. The apparatus of claim 8 wherein the inverse placed optical element is a Newton telescope.

* * * * *